US008624909B2

(12) United States Patent
Laksono

(10) Patent No.: US 8,624,909 B2
(45) Date of Patent: Jan. 7, 2014

(54) IMAGE PROCESSING SYSTEM AND METHOD THEREOF

(75) Inventor: Indra Laksono, Richmond Hill (CA)

(73) Assignee: ViXS Systems Inc., Toronto, ON (CA)

( * ) Notice: Subject to any disclaimer, the term of this patent is extended or adjusted under 35 U.S.C. 154(b) by 1976 days.

(21) Appl. No.: 11/285,643

(22) Filed: Nov. 21, 2005

(65) Prior Publication Data

US 2007/0115294 A1    May 24, 2007

(51) Int. Cl.
*G09G 5/00*     (2006.01)
(52) U.S. Cl.
USPC .................... 345/582; 345/422; 345/644
(58) Field of Classification Search
USPC ............................ 345/422, 582, 644
See application file for complete search history.

(56) References Cited

U.S. PATENT DOCUMENTS

| 6,016,151 | A   | * | 1/2000  | Lin .................... 345/582 |
| 6,035,364 | A   | * | 3/2000  | Lambrecht et al. ...... 710/305 |
| 6,226,012 | B1  | * | 5/2001  | Priem et al. ........... 345/606 |
| 6,311,258 | B1  | * | 10/2001 | Gibson et al. .......... 711/200 |
| 6,952,211 | B1  |   | 10/2005 | Cote et al. |
| 7,092,035 | B1  | * | 8/2006  | Pether ................. 348/581 |
| 7,158,132 | B1  | * | 1/2007  | Moffitt et al. ......... 345/421 |
| 2003/0160793 | A1 | * | 8/2003 | Emberling et al. ...... 345/506 |
| 2004/0130552 | A1 | * | 7/2004 | Duluk et al. ........... 345/506 |
| 2005/0125369 | A1 | * | 6/2005 | Buck et al. ............. 706/12 |
| 2005/0197977 | A1 | * | 9/2005 | Buck et al. ............. 706/12 |
| 2005/0219415 | A1 | * | 10/2005 | Young et al. .......... 348/554 |
| 2006/0056708 | A1 | * | 3/2006 | Shen et al. ............ 382/232 |
| 2006/0204119 | A1 | * | 9/2006 | Feng et al. ............ 382/250 |

* cited by examiner

*Primary Examiner* — Maurice L McDowell, Jr.

(57) ABSTRACT

A method and system is described by which a graphics engine can be shared to implement the functions of video encoder, such as video compression, to generate motion vectors.

19 Claims, 6 Drawing Sheets

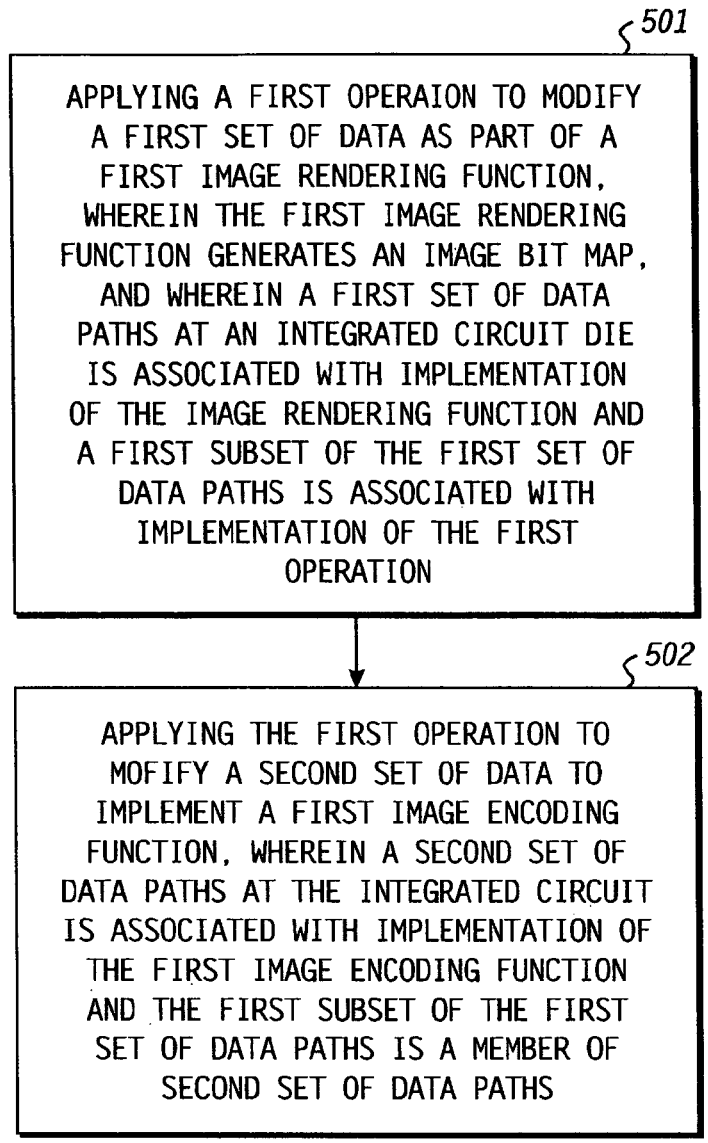

501 APPLYING A FIRST OPERAION TO MODIFY A FIRST SET OF DATA AS PART OF A FIRST IMAGE RENDERING FUNCTION, WHEREIN THE FIRST IMAGE RENDERING FUNCTION GENERATES AN IMAGE BIT MAP, AND WHEREIN A FIRST SET OF DATA PATHS AT AN INTEGRATED CIRCUIT DIE IS ASSOCIATED WITH IMPLEMENTATION OF THE IMAGE RENDERING FUNCTION AND A FIRST SUBSET OF THE FIRST SET OF DATA PATHS IS ASSOCIATED WITH IMPLEMENTATION OF THE FIRST OPERATION

502 APPLYING THE FIRST OPERATION TO MOFIFY A SECOND SET OF DATA TO IMPLEMENT A FIRST IMAGE ENCODING FUNCTION, WHEREIN A SECOND SET OF DATA PATHS AT THE INTEGRATED CIRCUIT IS ASSOCIATED WITH IMPLEMENTATION OF THE FIRST IMAGE ENCODING FUNCTION AND THE FIRST SUBSET OF THE FIRST SET OF DATA PATHS IS A MEMBER OF SECOND SET OF DATA PATHS

*FIG. 5*

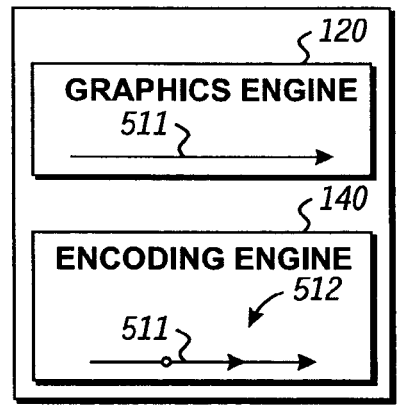

*FIG. 6*

IMAGE PROCESSING SYSTEM AND METHOD THEREOF

FIELD OF THE DISCLOSURE

The present disclosure relates generally to data processing and more specifically to processing image data.

BACKGROUND

Two major types of image data have been historically recognized in the image processing arts—graphics data and video data. Graphics data generally refers to computer generated data that defines still images using primitive shape definitions, such as triangles, rectangles and ovals. These primitive shape definitions are converted to pixel information, in the form of bit maps, before being sent to a display device. Video data generally refers to data that stores pixel information to generate a sequence of still pictures back-to-back to produce a moving image.

Traditionally, video data was analog data transmitted to a television, which would use analog circuitry to create a sequence of still pictures back-to-back to produce a moving image. The ready availability of high-speed digital electronics resulted in video coding/decoding (codec) technology, whereby each still image of a video sequence is digitally encoded and subsequently decoded for display.

In order to efficiently process graphics data, graphics based digital systems, generally referred to as graphics processors and graphics engines, were developed to address graphics-specific needs associated with generating images from primitive-based definitions. Specialized graphics processors have evolved, and include sophisticated processing modules that facilitate the display of images onto a 2-Dimensional display device. For example state-of-the-art graphics systems are capable of synthesizing three-dimensional images onto two-dimensional display devices, such as a traditional computer monitor, using specialized digital processing modules to provide lighting, shading, texture, and Z-data.

Prior art FIG. 1 illustrates a system 10 comprising a graphics engine 14 and an encoder 16. Data paths 21 and 22 are illustrated at FIG. 1 to represent a sequence of connections and devices through which information received by the graphics engine 14 and encoder/decoder 16, respectively, for a specific operation. The fact that data paths 21 and 22 do not overlap is indicative of the fact that the graphics engine 14 does not share resources with the encoder 16, which has resources implemented separately from the graphics engine 14. Therefore, it is noted that the recent convergence of multimedia systems has resulted in systems comprising both video processing-specific modules, such as encoder 16, and graphics processing-specific modules, such as graphics engine 14. However, while such systems allow for easy replication of existing technology, it often results in multiple system components, or system components having large areas that can result in unnecessary power consumption. Therefore, a system or method that reduces the size of components in a such a system would be useful.

BRIEF DESCRIPTION OF THE DRAWINGS

The present disclosure may be better understood, and its numerous features and advantages made apparent to those skilled in the art by referencing the accompanying drawings.

FIG. 5 illustrates, in flow diagram form, a method in accordance with a specific embodiment of the present disclosure.

FIG. 6 illustrates the block diagram of FIG. 2 illustrating specific data paths.

The use of the same reference symbols in different drawings indicates similar or identical items.

DESCRIPTION OF THE PREFERRED EMBODIMENT(S)

In accordance with a specific embodiment of the present disclosure, resources of a graphics engine are shared with an encoding engine. A specific implementation of the sharing of such resources will be better understood with reference to FIGS. 2-11 discussed below.

Figure 1:
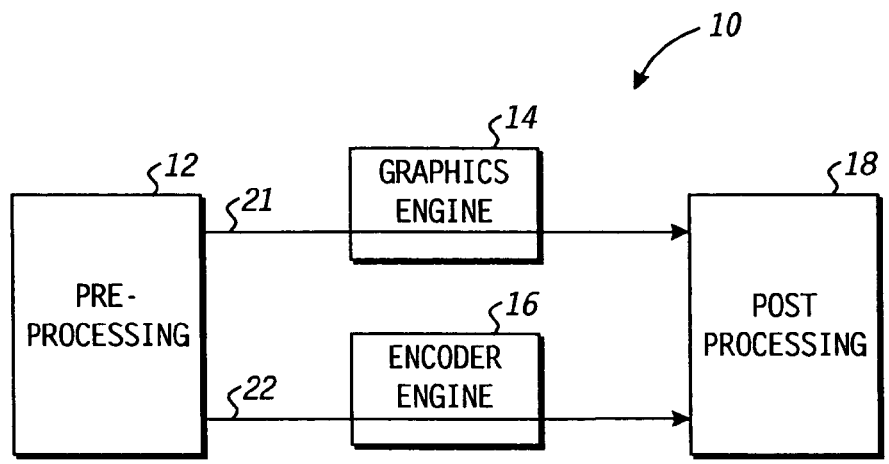
FIG. 1 illustrates a prior art system.
Figure 2:
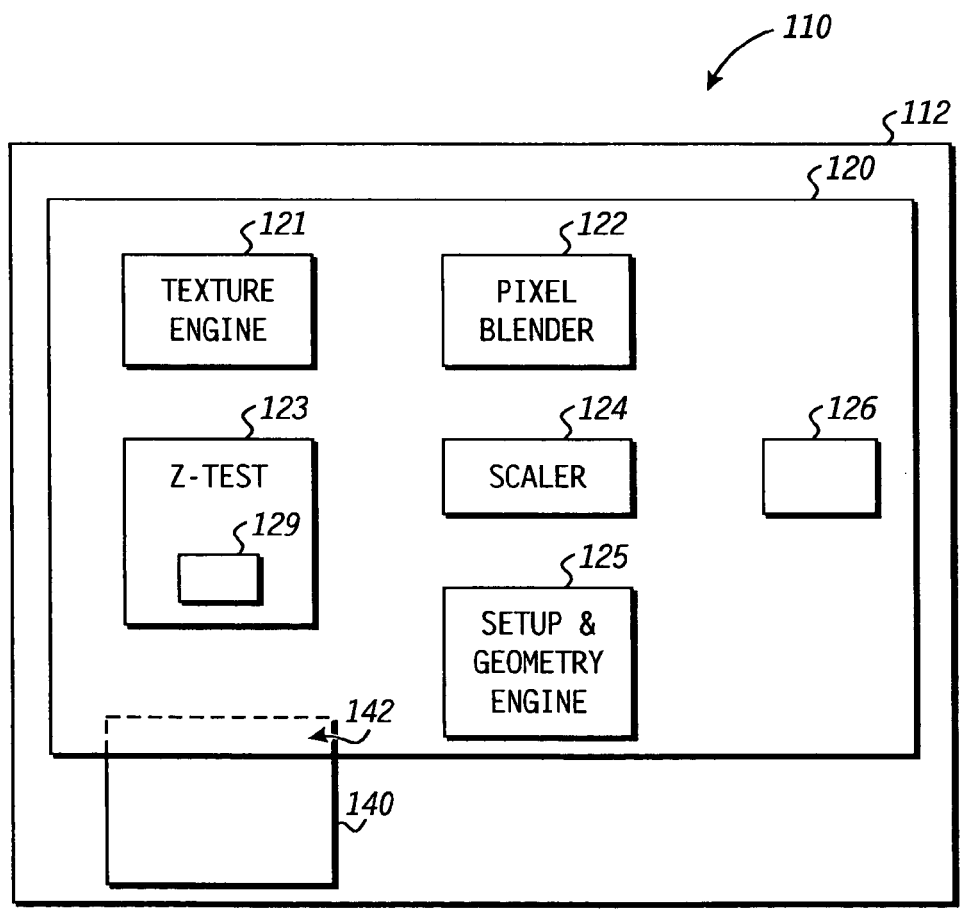
FIG. 2 illustrates, in block diagram form, a system in accordance with a specific embodiment of the present disclosure.

FIG. 2 illustrates an integrated circuit device 110 disposed at a die 112. Device 110 includes modules 120 and 140. In one embodiment, module 120 represents a graphics engine (also referred to as graphics engine 120) and module 140 represents an image encoder (also referred to as encoder 140). Graphics engine 120 includes the connections and components needed to implement a set of graphics functions. Modules 121-125 represent some traditional graphics functions implemented by graphics engines. For example, module 121 is a texture engine module for implementing texture mapping functions, module 122 is a pixel blender module for blending images, module 123 is a Z-test module determining relative depths of images in three dimensional space, module 124 is a scaler module for scaling images, module 125 is a set-up and geometry engine module that pre-processes some types of information for use by other modules. It will be appreciated that each of the modules 121-125 of FIG. 2 can themselves have sub-modules associated with them, for example, the Z-test module 123 can have access to a compare module used to implement the Z-test function. A compare module used by the Z-test module can be dedicated to the Z-test module, such as module 129, or can be a module accessible to other modules such as module 126. Various portions of graphics engine 120 can be implemented, for example, using hardware, software, or a combination thereof.

Encoder 140 is illustrated to overlap with graphics engine 120. The overlapping portion 142 is represented by a dashed line, and indicates that resources of graphics engine 120 are shared with encoder 140. A specific embodiment of sharing resources between graphics engine 120 and encoder 140 is discussed with reference to a specific embodiment illustrated in FIG. 3.

Figure 3:
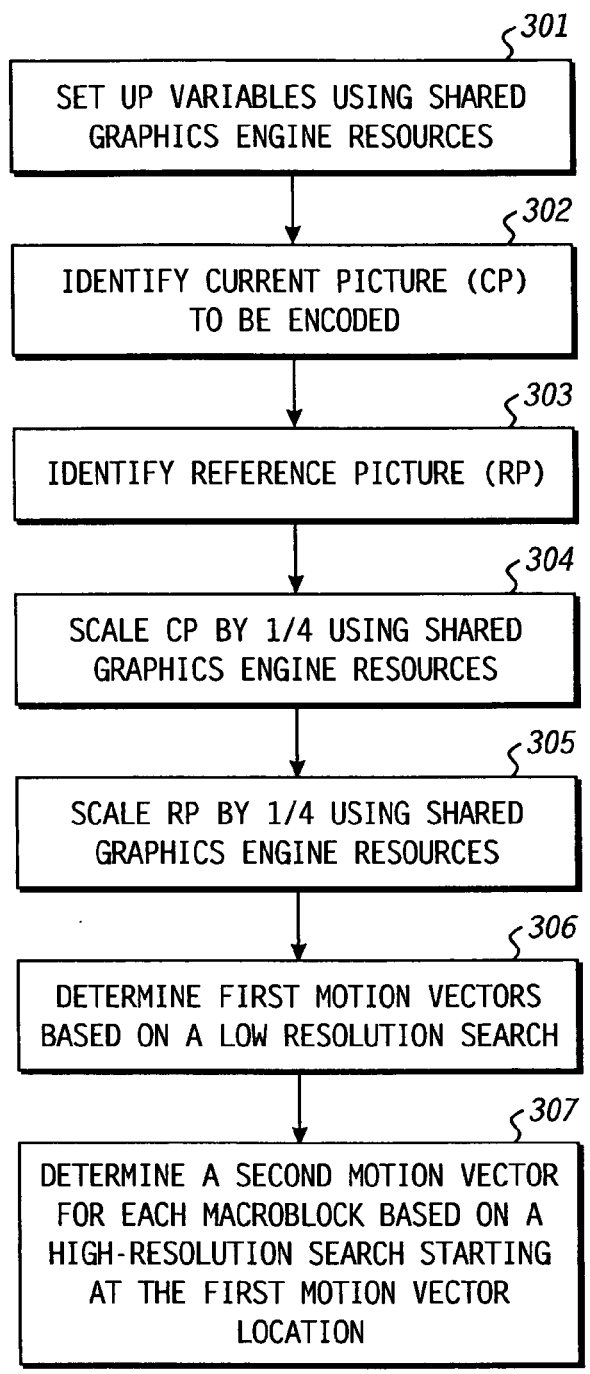
FIG. 3 illustrates, in flow diagram form, a method in accordance with a specific embodiment of the present disclosure.

FIG. 3 includes an illustration of a flow diagram for determining motion vectors, such as motion vectors for MPEG, as part of an image encoding process. At 301, variables are initialized. In accordance with a specific embodiment, each element of a matrix MVR is initialized to a large value, which for exemplary purposes has been chosen to be 100. MVR has a size of MX×MY, where Mx is the number of image blocks, usually 16×16 pixel blocks referred to as macroblocks, in the x-direction for a current picture (CP), and MY is the number of image blocks in the y-direction for the CP. Note that the value of 100 for the elements of the matrix MVR was selected based on an assumption that the graphics engine being used treats a Z-buffer value of zero (0) as the front-most plane for three-dimensional images.

At 302 a current picture (CP) to be encoded is identified.

At 303 a reference picture (RP) to be searched to determine motion vectors for CP is identified.

At 304 the CP is scaled by ¼ using shared graphics engine resources to generate a scaled matrix CP'. In one embodiment, a scaler engine is used to implement a scaling function: D←SCALE(S, Xscale, Yscale); where D is the destination matrix, S is the source matrix, Xscale is a scale factor in the X-direction to be applied to S, and Yscale is a scale factor in the Y-direction to be applied to the S. Therefore, the operation CP'←SCALE(CP, ¼, ¼) represents a scaler function of the graphics engine that scales CP by ¼ in both the X-direction and Y-direction, and writes the result to CP'. As a result, 4×4 blocks of CP picture elements are represented as a single element in CP'. Therefore, a macroblock of CP, comprising sixteen (16) 4×4 blocks, is represented in CP' by one (1) 4×4 block.

At 305, RP is scaled by ¼ using a shared graphics engine resources to generate a scaled matrix RP'. In one embodiment a scaler engine is used to implement the operation RP'←SCALE(RP, ¼, ¼). Each 4×4 block of RP picture elements is represented as a single element in RP'. Therefore, a macroblock of RP, comprising sixteen (16) 4×4 blocks, is represented in RP' by one (1) 4×4 block.

It will be appreciated that graphics engine modules other than a scaler can be used as a shared graphics engine resource to scale data. For example, a texture engine, which itself may use the scaler, can be used in a manner similar to that discussed below.

At 306, first motion vectors for the CP are determined using a low-resolution search using shared graphics engine resources. First motion vectors determined at 306, if any, can be used as a starting point for a high-resolution motion vector search at 307.

In one embodiment, a texture engine of a graphics engine is used to implement the following texture mapping operations:

```
                                    Texture Mapping Operation (1)
D1←TXTMAP (    T1 = RP',
               T2 = CP',
               Destination Space Triangle =
                   V1 = 0, 0, 25;
                   V2 = Xmax/4, 0, 25;
                   V3 = 0, Ymax/4, 25;
               Texture Space Triangle =
                   V1 = 0+DX, 0+DY;
                   V2 = Xmax+DX, 0+DY;
                   V3 = 0+DX, Ymax+DY;
               Op = If Z-test true then Store(T1 − T2)
          )
                                    Texture Mapping Operation (2)
D1←TXTMAP (    T1 = RP',
               T2 = CP',
               D1 Z Buffer = MVR,
               Destination Space Triangle =
                   V1 = Xmax/4, Ymax/4, 25;
                   V2 = Xmax/4, 0, 25;
                   V3 = 0, Ymax/4, 25;
               Texture Space Triangle =
                   V1 = Xmax+DX, Ymax+DY;
                   V2 = Xmax+DX, 0+DY;
                   V3 = 0+DX, Ymax+DY;
```

```
               Op = If Z-test true then Store(T1 − T2)
          )
where:
     -- Xmax is the number of elements of RP' in the x-direction
     -- Ymax is the number of elements of RP' in the y-direction
     -- DX is offset that is a multiple of 4;
     -- DY is offset that is a multiple of 4;
```

Texture mapping operation (1) defines triangles corresponding to a lower-left half of a picture, while texture mapping operation (2) defines triangles corresponding to an upper-right half of a picture, such that operations (1) and (2) combined be used to fully process information for square pictures, such as the CP and the RP. Note that while triangles have been described as the texture space shape being used, in other embodiments other shapes, such as quadshapes, ovals, and the like can also be used.

Operations (1) and (2) treat CP' and RP' as textures, and will generate a ¼×¼ destination bitmap of the difference of the bitmap CP' subtracted by RP' for locations passing a Z-test criteria. Note that the matrix MVR is used as the Z-buffer for the destination matrix. Since each element of MVR has been initialized to have a Z-value of 100, every location of CP' and RP' will be processed by operations (1) and (2) during a first pass because the destination triangle has a depth value, i.e. a Z-value of 25, which is less than 100. Scaling of RP' at the destination bitmap by ¼ in both the x-direction and the y-direction occurs, as well as the indicated subtraction between the scaled CP and RP results. The resulting values are stored at the destination D1. Each value of D1 corresponds to a specific macroblock of CP, and represents an estimated entropy value between a a CP macroblock and a RP macroblock.

Note that the texture space triangles can be offset from the destination space triangles by multiples of 4 to predict the entropy between macroblocks of CP and macroblocks of DP that are not co-located. For example, a value of (DX, DY)=(0, 0) results evaluating each macroblock of CP with its co-located macroblock of DP. A value of (DX, DY)=(4, 0) would result in evaluating each macroblock of CP with a corresponding macroblock of DP that is offset by 1 macroblock from its co-located macroblock. Note that a value of 4 for DX or DY indicates an offset of four elements of RP'. In addition, an offset of four (4) RP' elements represents a corresponding offset of 16 elements of RP, because each element of RP' represents four elements of RP. Therefore, an offset of four elements of RP' corresponds to an offset of one macroblock. As a result, each increment of four in the value of DX represents a different macroblock in the x-direction, while each increment of four in the value of DY represents a different macroblock in the y-direction.)

Figure 4:
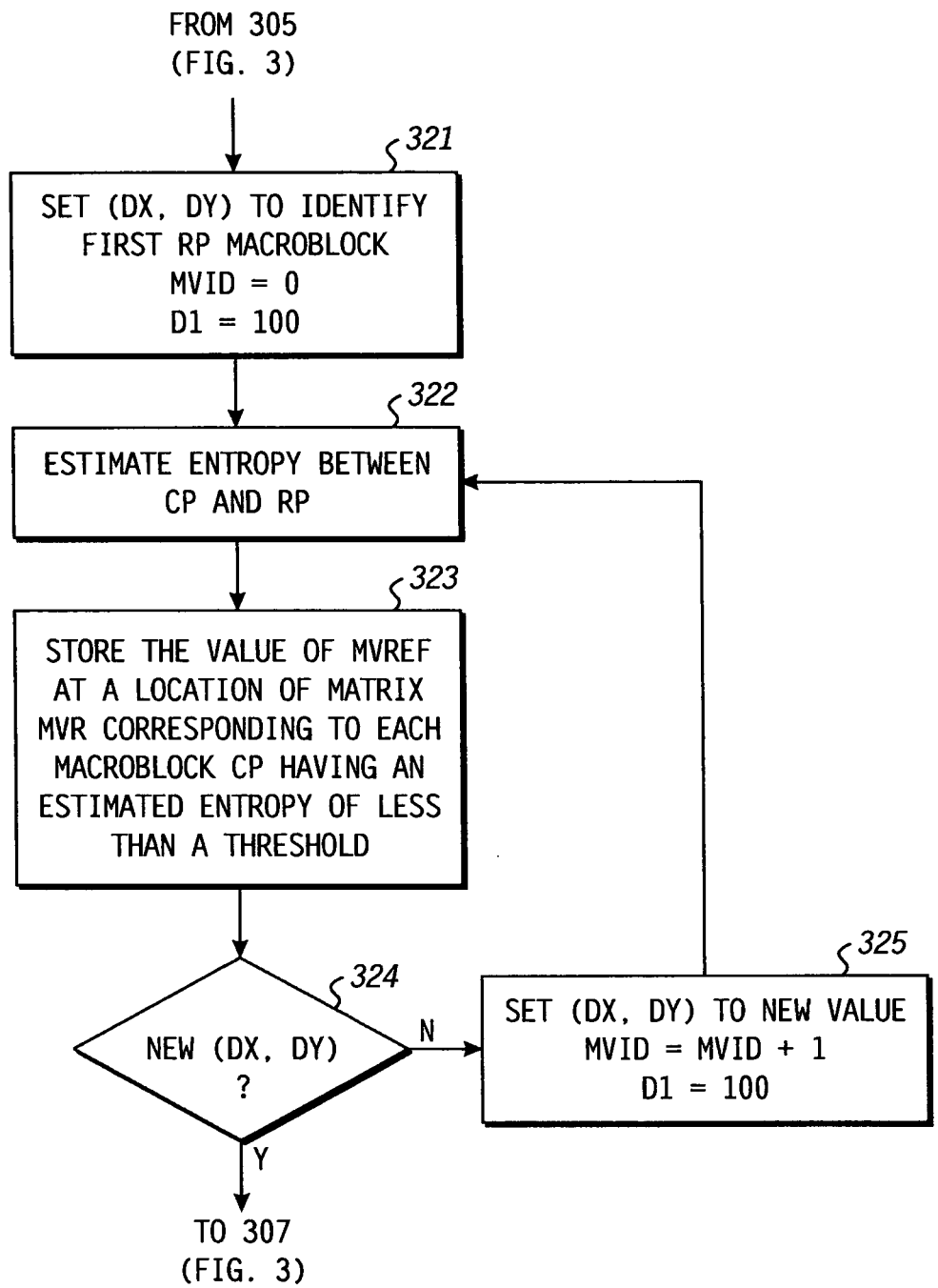
FIG. 4 illustrates, in flow diagram form, a detail method of a portion of FIG. 3.

FIG. 4 illustrates an exemplary implementation of 306. At 321, values are selected for (DX, DY). For example, (DX, DY) can be set to (0, 0), representing the motion vector zero. The motion vector zero is a good starting point since there is a strong likelihood that entropy between co-located macroblocks will be low. Variable MVID is set to a value associated with the specific (DX, DY) being used. For motion vector zero it is assumed that MVID has a value of 0.

At 322 the entropy for each macroblock of CP relative to a macroblock of RP indicated by the value of (DX, DY). As described previously, each element of destination matrix D1 will contain a predicted entropy value for each macroblock of CP.

At 323 the predicted entropy for each macroblock of CP is checked to determine if the it meets a threshold. If so, the value of MVID is written to a corresponding location of MVR, to indicate that the current offset value (DX, DY) is likely to represents a intermediate motion vector for a corresponding macroblock of CP that is at or near a final motion vector. By selecting MVID to be less than the value to which MVR was initialized, it is readily determined which value of (DX, DY), and therefore which macroblocks of CP, resulted in an entropy value below the threshold. For example, by storing MVID values at corresponding macroblock locations of MVR, those macroblocks having a low predicted entropy for a motion vector zero can be later identified.

In one embodiment, 323 is accomplished using a shared graphics engine function. For example, a Z-test engine can be used to compare the predicted entropy values of D1 to a threshold value. In one embodiment, a Z-test engine of a graphics engine is used to implement the following Z-test operations:

```
                        Z-Test Operation (1)
MVA←ZTEST (    Z-buffer = D1;
               Destination Space Triangle =
                   V1 = 0, 0, Vth;
                   V2 = Xmax/16, 0, Vth;
                   V3 = 0, Ymax/16, Vth;
                   Op = (If Destination Space Triangle is Front then
                        store Z-buffer value at Destination)
)
                        Z-Test Operation (2)
MVA←ZTEST (    Z-buffer = D1;
               Destination Space Triangle =
                   V1 = Xmax/16, Ymax/16, Vth;
                   V2 = Xmax/16, 0, Vth;
                   V3 = 0, Ymax/16, Vth;
                   Op = (If Destination Space Triangle is Front then
                        store Z-buffer value at Destination)
)
```

Z-test operation (1) defines triangles corresponding to a lower-left half of a picture, while Z-test operation (2) defines triangles corresponding to an upper-right half of a picture, such that operations (1) and (2) combined be used to fully process a square matrix, such as D1 being used as a Z-buffer.

Z-test operations (1) and (2) treat the destination matrix D1 as a Z-buffer to which a depth of a Destination Space Triangle is being compared. The Destination Space Triangle is represented in three-dimensional (3D) coordinates, with the Z-co-ordinate, i.e. the depth coordinate, being set equal to a desired threshold value to which each element of D1 will be compared. For example, the Z-test operations (1) and (2) result in a value equal to the current MVID being written to those locations of matrix MVR corresponding to CP frames where the predicted entropy for a corresponding CP frame meets a threshold Vth. Therefore, after a first application of Z-Test operations (1) and (2) for motion vector zero, each element of MVR will have a value equal to zero (0), thereby predicting motion vector zero as a motion vector from which a detailed search can be perform, or a value equal to the initialization value, which is selected to be larger than any anticipate value of MVID, to allow sharing of the Z-test resource.

At 324 a determination is made whether a new motion vector is to be evaluated using the low-resolution search of 306. In one embodiment, a fixed number of motion vectors, such as five (5) motion vectors or nine (9) motion vectors are tried. (The five motion vectors would typically include motion vector zero and the four motion vectors immediately adjacent to motion vector zero in an orthogonal direction, while the nine motion vectors would include the 5 motion vectors and the 4 motion vectors immediately adjacent motion vector zero in a diagonal direction). If additional motion vectors are to be tried, flow proceeds to 325, otherwise flow proceeds to 307.

At 325, (DX, DY) is set to a new value representative of a new motion vector. The value of MVID will incremented to a new value that is uniquely associated with the new value (DX, DY). Each element of a destination matrix D1 is initialized to a value that is larger than any expected threshold value Vth, such as the value 100 in the present embodiment.

Flow proceeds from 325 back to 322 to determine predicted entropy between CP and DP for the new value of (DX, DY). During subsequent implementations of 322, the Z-test feature of texture mapping operations (1) and (2) will prevent D1 from being updated at those locations where a predicted motion vector has been determined. For example, if the value of MVR, which is treated as a Z-buffer for destination D1, was set to 0 at a specific location to predict a motion vector zero, then the specific location is not evaluated using subsequent motion vectors. In accordance with a specific embodiment, selective processing of only those locations not yet associated with a predicted motion vector is accomplished by using MVR as the destination Z-buffer, and setting the destination triangles to have depth values (z-dimensions) larger than any anticipated MCID values, such as 25, but lower than the value to which MVR was initialized at 302. Note that during subsequent implementations of 323, locations of D1 that were not updated with entropy values based on the motion vector will still have their initialized value from 325, which is 100 in the present example. This initialization value of D1 at 325 was selected to be larger than Vth to assure the once an MVID value is written to MVR that it is not overwritten by a subsequent motion vector.

Once the desired values of (DX, DY) have been processed, each value of MVR will correspond to a specific motion vector if a sufficiently low entropy was predicted for its corresponding macroblock, or have the initialization value of 100 if a sufficiently low entropy was not was predicted by any value of (DX, DY) for its corresponding macroblock.

At 307 of FIG. 3, the values of MVR that identify a predicted motion vector based on a low-resolution search are used to control which macroblocks of CP are to be subjected to a high-resolution search. For example, each location of MVR having a motion vector indicator, i.e. a value between 0-4 if five motion vectors are considered at 306, can be evaluated using a high-resolution motion vector search to determine if a final motion vector can be identified.

During high-resolution searches at 307, an attempt is made to identify a final motion vector based on a more accurate search using the results of the low-resolution search of 306 as a starting point. Therefore, each element of MVR having a value indicative of a motion vector, i.e. a value between 0-4, is subject to the high-resolution search of 307. For elements of MVR not associated with an estimated motion vector from the low-resolution search the corresponding macroblock of CP will be treated as an intra-macroblock having no motion vectors, and be encoded appropriately.

Therefore, a high-resolution search will be performed at 307 for each MVR[i,j] having a predicted motion vector value in MVR. For example, a full subpixel ±2 search can be performed starting at the predicted motion vector as indicated at MVR[i,j] to determine if a motion vector resides at or near an associated offset (DX, DY). For example, a value of 0 stored at MVR[i,j] would indicate that the motion vector zero has been predicted and the high-resolution search can be performed near (0, 0). It will be appreciated that this high-resolution search can be performed using graphics engine functions similar to those described previously. Note that instead of performing each search with the full picture CP as described previous, a search can be performed for each macroblock of CP individually.

It will be appreciated that a ½ pel displacement in each DX, DY can be obtained using a bilinear operation where we use (p1+p2+1)*½ for each consecutive pixels p1,p2. A ¼ pel displacement can be treated as (¼*p1+¾*p2). It will be further appreciated that there are other more complex arithmetic operations within the subpixel treatment of motion vectors within other codecs, but it is readily recognized that by modifying this approach, there can be small changes to the texture mapping operation to handle the different blending of subpixel construction.

FIG. 5 illustrates in flow diagram form a method in accordance with the present disclosure. At 501, a first operation is applied to modify a first set of data to implement a first image rendering function, wherein the first image rendering function generates an image bit map to be displayed. A first set of data paths at an integrated circuit die is associated with implementation of the image rendering function, wherein the first operation is associated with data paths that are a subset of first set of data paths.

In a specific embodiment, a first image rendering function can be associated with a specific graphics engine command that is implemented at the graphics engine using a subset of the graphics engine components and connections. The term "data path" is used herein to refer to a set of components and connections through which information can flow to implement a specific function. For example, graphics engine 120 has a data path, represented in FIG. 6 by arrow 511, through which execution of its functions, i.e. commands, is implemented. Similarly, encoder 140 has a data path, represented in FIG. 6 by arrow 512, through which execution of its functions, i.e. commands, is implemented. Note that the graphics engine data path 511 is part of the data path 512 of the encoder engine 140 because the encoder engine 140 can use functions of the graphics engine 120 to implement its own commands.

Figure 7:
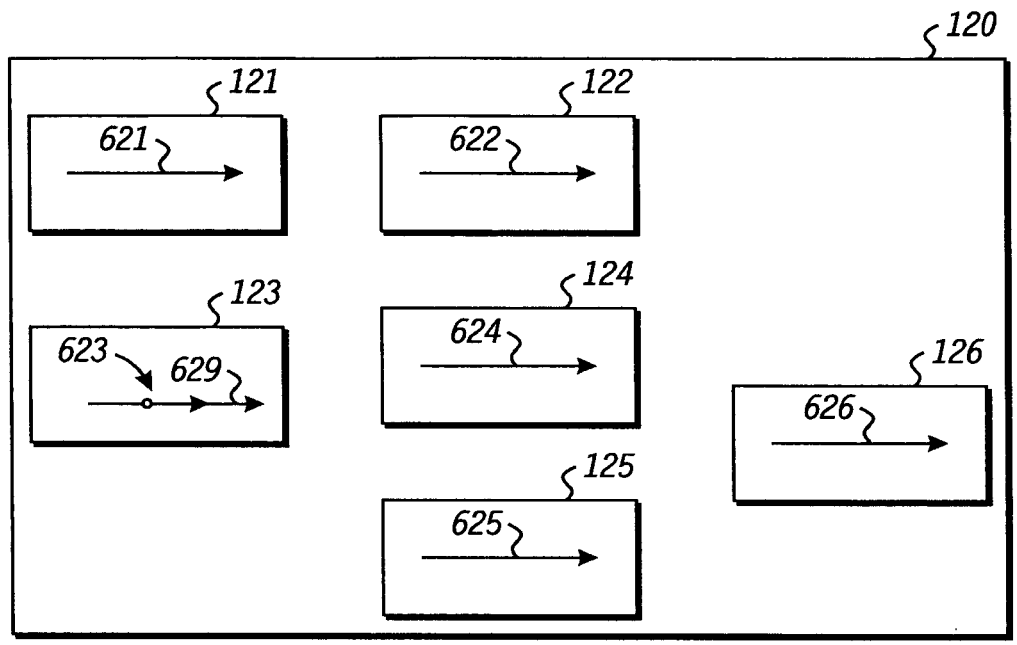
FIG. 7 illustrates a portion of the block diagram of FIG. 2 illustrating specific data paths.
Figure 8:
FIGS. 8 and 10 illustrate a data paths for modules of FIG. 2.

It will be further appreciated that the submodules 121-126 of graphics engine 120, as well their subcomponents, each have associated data paths. A data path of a sub-module of graphics engine 120 is, by definition, a subset, i.e., subpath, of the graphics engine 120 data path 511. For example, FIG. 7 illustrates texture module 121 having a data path 621, pixel blender 122 having a data path 622, Z-test module 123 having a data path 623, scaler 124 having a data path 624, set-up & geometry engine 125 having a data path 625, and module 126 having a data path 626. In addition, Z-test engine 123 has a sub-module 129, which has a data path 629 that is a subset, or a portion, of data path 623. FIG. 8 graphically illustrates the data path 511 of graphics engine 120 as including each of the data paths 621-626. Note that data path illustrations herein are different than data flow diagrams, in that the relative location of sub-modules data path does provide data flow information. For example, referring to FIG. 8, the location of data path 622 does not represent a sequential order of its use relative to the other data paths making up data path 511. Instead, the inclusion of data path 622 in data path 511 only indicates that data path 622 is used by graphics engine 120 to implement at least one graphics engine function.

Figure 9:
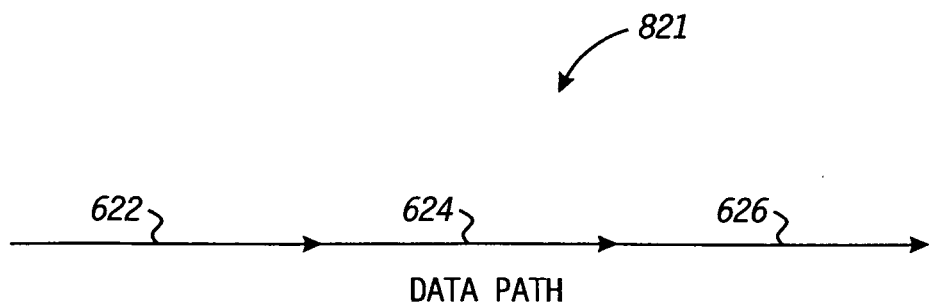
FIGS. 9 and 11 illustrate a data path for functions implemented at modules of FIG. 2.

While every function of the graphics engine can be implemented using data path 511, individual functions of graphics engine 120 are typically implemented using only a portion of the data paths making up the data path 511. For example, FIG. 9 represents a data path 821 used to implement a specific function using graphics engine 120, such as a function that scales an image and blends it with another image. Such a function is illustrated to include data paths 622, 624, and 626.

Data paths shown as part of data path 821 are needed implement the specific function to which data path 821 is associate. For example, inclusion of data paths 622, 624, and 626 in data path 821 indicates that the specific function associated with data path 821 share function associated with the pixel blender 122, the scaler 124, and the module 126. Note module 126 can represent, for example, a matrix arithmetic engine.

Figure 10:
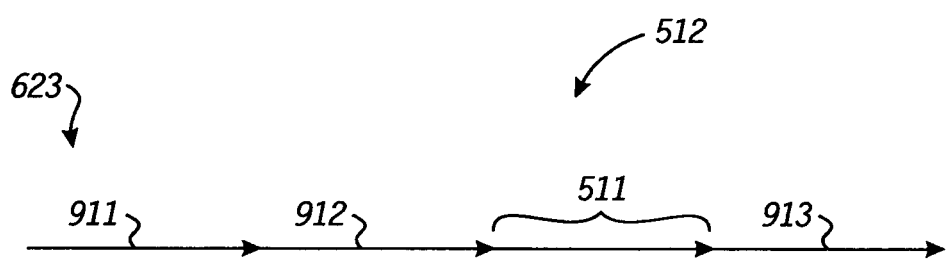

FIG. 10 is a specific representation of the data path 512 of the encoder 140, which includes data paths 911-913, associated with specific sub-modules (not illustrated) of the encoder 120, and data path 511. The inclusion of data path 511 in data path 512 is indicative of the fact that encoder functions need to share at least some of the graphics engine resources. Sharing of graphics engine resources can be accomplished by by using issuing commands to the graphics engine 140 from a controller of the encoder 140.

Figure 11:
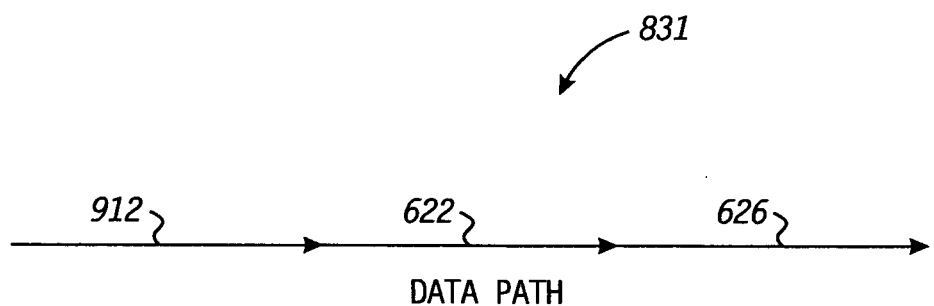

FIG. 11 represents a data path 831 used to implement a specific encoder engine 140 function. For example, the specific function can perform a motion vector search. The data paths associated with data path 831 include data path 912 from a sub-module (not illustrated) of the encoder engine 140, and data paths 622 and 626 from sub-modules of the graphics engine, which are used to implement at least one specific graphics engine function. For example, the specific encoder function associated with data path 821 utilizes the data path 622 of the pixel blender 122 and the data path 626 of the module 126.

With respect to 501 of the method of FIG. 5, an example of a first image rendering function would be the scale/blend function discussed with reference to FIG. 9 that both scales and blends an image. An example of the first operation of 501 would be the scaling function implemented using data path 624 of the scaler 124.

At 502 (FIG. 5), the first operation is applied to modify a second set of data to implement a first image encoding function, wherein the first image encoding function generates an encoded data representing an image of the second set of data, such as motion vectors. A second set of data paths at the integrated circuit die is associated with the implementation of the image encoding function, wherein the data paths of the first operation are members, i.e. a subset, of the second set of data paths. For example, comparing data path 831, as represented at FIG. 11, with the data path 821, of FIG. 9, reveals that the blending operation 122 having data path 622 is used by both the first image rendering function having data path 821 and the first image encoding function having data path 831.

The specific embodiments described above illustrate specific usage of shared graphics engine resources to encode an image by identifying motion vectors. The use of shared graphics engine resources can be useful in other areas of encoding as well. For example, many encoding techniques use compression that allows for lossiness, resulting in the need to quantize image information. Quantization is performed by having each element divided by another matrix of scalar values. The scalar divide is simple $M[i,j]/Q[i,j]$ where Q is the quantization matrix. Let $INVQ=(1/Q)=\{1/Q[i,j]\}$. It will be readily appreciated by one skilled in the art that if M and INVQ are treated as two textures, it would be a simple operation to perform $D \leftarrow M*INVQ$ and complete the quantization using a graphics engine function, such as the blend engine 622, or a texture mapping having blending capabilities.

It will be appreciated that a specific embodiment of the present disclosure anticipates a first set of image data being provided to a graphics engine for processing. For example, the encoder engine 140 can provide image data to the graphics engine 120 for processing as previously described. The graphics engine provides a second data based upon the first set of image data that is received at the encoder engine 140. Note that one of ordinary skill in the art will recognize that the data between processing engines can be received and provide through the use of pointers to memory locations. The processed information is then used by the graphics engine to determine a motion vector for the first set of image data.

One of ordinary skill in the art will recognize that encoder control logic can be used to submit commands to a graphics engine for processing. Alternatively, encoder control logic can multiplex into specific functions of a graphics engine, and use their functionality without specifically submitting actual graphics engine commands.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, principles of the invention have been described above in connection with specific embodiments. However, one of ordinary skill in the art appreciates that one or more modifications or one or more other changes can be made to any one or more of the embodiments without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

What is claimed is:

1. A method comprising:
applying a first operation to modify a first set of data to implement a first image rendering function, wherein the first image rendering function generates an image bit map to be displayed, and wherein a first set of data paths at an integrated circuit die is associated with implementation of the first image rendering function and a first subset of the first set of data paths is associated with an implementation of the first operation; and
applying the first operation to a modify a second set of data to implement a first image encoding function, wherein a second set of data paths at the integrated circuit is associated with an implementation of the first image encoding function and the second set of data paths includes the first subset of the first set of data paths.

2. The method of claim 1 wherein the first image rendering function is a texture mapping function and the first set of data includes texture data.

3. The method of claim 2 wherein the texture mapping function is a Z-test function.

4. The method of claim 2 wherein the first operation is a matrix compare operation.

5. The method of claim 1 wherein the first operation is a matrix compare operation.

6. The method of claim 1, wherein the first image encoding function determines a set of motion vectors based on the second set of data.

7. The method of claim 6, wherein the first operation is a matrix arithmetic operation.

8. The method of claim 1, wherein the first operation is a matrix arithmetic operation.

9. The method of claim 1, wherein the second set of data includes an image bit map.

10. The method of claim 9, wherein the first set of data includes an image bit map and primitive shape information, wherein the image bit map is to be provide a texture to a primitive corresponding to the primitive information.

11. The method of claim 10, wherein the second set of data includes an image bit map.

12. The method of claim 1, wherein the first image encoding function quantizes a set of image data.

13. The method of claim 1, wherein the first image rendering function is a pixel blending function.

14. The method of claim 1, wherein the first operation is a dot product operation.

15. A system comprising:
a first set of hardware data paths that comprise a first set of components and connections through which information flows to implement a first image rendering function, the first set of data paths including a first subset associated with an implementation of the first imagine rendering function; and
a second set of hardware data paths that comprise a second set of components and connections through which information flows to implement a first image encoding function, wherein the first and second sets are different and wherein the second set of data paths includes the first subset of the first set of data paths.

16. The system of claim 15 wherein the first subset of the fit set of data paths implements a matrix arithmetic operation.

17. The system of claim 15, wherein the first subset of the first set of data paths implements a matrix compare operation.

18. The system of claim 17, wherein the first image rendering function is a Z-test function.

19. The system of claim 15 wherein the second set of data paths determine motion vectors for an image bit map.

* * * * *

UNITED STATES PATENT AND TRADEMARK OFFICE
CERTIFICATE OF CORRECTION

PATENT NO.        : 8,624,909 B2
APPLICATION NO.   : 11/285643
DATED             : January 7, 2014
INVENTOR(S)       : Indra Laksono Page 1 of 1

It is certified that error appears in the above-identified patent and that said Letters Patent is hereby corrected as shown below:

In the Claims:

Column 10, Line 38, please change "the first set of data paths including a first subset associated with an implementation of the first imagine rendering function; and" to -- the first set of data paths including a first subset associated with an implementation of the first image rendering function; and --

Column 10, Line 47, please change "The system of claim 15 wherein the first subset of the fit set of data paths implements a matrix arithmetic operation." to -- The system of claim 15 wherein the first subset of the first set of data paths implements a matrix arithmetic operation. --

Signed and Sealed this
Second Day of September, 2014

Michelle K. Lee
*Deputy Director of the United States Patent and Trademark Office*